United States Patent [19]
Nishida et al.

[11] Patent Number: 5,383,128
[45] Date of Patent: Jan. 17, 1995

[54] NAVIGATION DEVICE

[75] Inventors: Junichi Nishida; Morio Araki; Takeharu Arakawa; Tessho Ishida; Yasushiro Ayukai; Toshiharu Baba; Masahiko Sakaguchi; Kenichi Nobe; Michihiro Kaneko; Jun Shinohara, all of Kawagoe, Japan

[73] Assignee: Pioneer Electronic Corporation, Tokyo, Japan

[21] Appl. No.: 56,998

[22] Filed: May 3, 1993

[30] Foreign Application Priority Data

May 8, 1992 [JP] Japan .................................. 4-116443

[51] Int. Cl.⁶ .................. G08G 9/00; G06F 15/50
[52] U.S. Cl. .................................... 364/449; 364/444; 340/990; 340/995
[58] Field of Search ............... 364/449, 444, 424.1; 340/990, 995, 996

[56] References Cited

U.S. PATENT DOCUMENTS

| | | | |
|---|---|---|---|
| 4,514,810 | 4/1985 | Ito et al. ................. | 364/449 |
| 4,954,959 | 9/1990 | Moroto et al. ........... | 364/449 |
| 4,992,947 | 2/1991 | Nimura et al. ........... | 364/444 |
| 5,184,303 | 2/1993 | Link ........................ | 364/449 |
| 5,220,507 | 6/1993 | Kirson ..................... | 364/444 |
| 5,243,528 | 9/1993 | Lefebvre .................. | 364/449 |

Primary Examiner—Kevin J. Teska
Assistant Examiner—Tan Q. Nguyen
Attorney, Agent, or Firm—Kane, Dalsimer, Sullivan, Kurucz, Levy, Eisele and Richard

[57] ABSTRACT

A navigation device includes measurement unit for measuring a current position of a vehicle and generating a current position data, route collection unit for generating route data on the basis of the current position data, place name extraction unit for extracting place name information with a predetermined interval from a map information in accordance with the current position data, storage unit for storing the route data and the place name information, the stored route data comprising a plurality of block route data each sectioned by the place name information, edit unit for editing the block route data stored in the storage unit, and display unit for extracting the route data from the storage unit and displaying the extracted route data together with the map information.

10 Claims, 9 Drawing Sheets

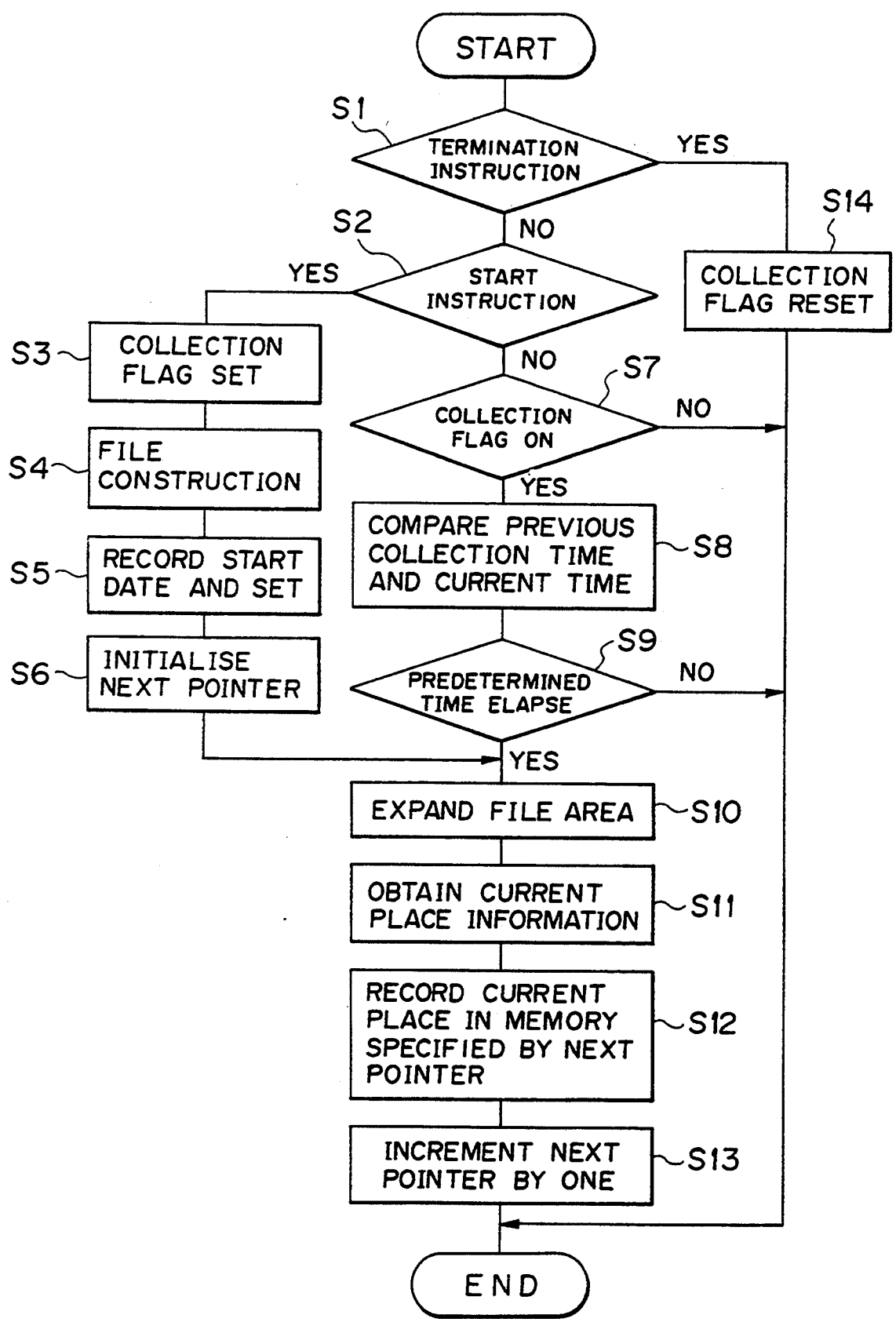

NAVIGATION DEVICE

BACKGROUND OF THE INVENTION

1. Field of the Invention

This invention relates to a navigation device for displaying current position information of a vehicle in map information to assist driving of the vehicle such as a car, and more particularly to a navigation device with means for storing route data of a traveled way through which the vehicle runs and passes, so as to display the route for driver's reference.

2. Description of the Prior Art

A vehicle navigation system using a navigation device which is mounted on a vehicle (hereinafter referred to as "navigation device") performs a navigation for a driver in a following manner. A current position of the vehicle is measured by a position-measuring means such as a GPS (Global Positioning System) or the like. Map information around the measured position and the current position of the vehicle which is momentarily shifting (changing) is displayed on the map in accordance with the measured current position of the vehicle. At the same time, a route data of a traveled route (way) through which the vehicle passed is stored in a memory so as to display the route extending to the current position together with the current position, as shown in FIG. 1.

In a case of driving a car, a driver travels to various destinations and frequently travels again to the destination to which he has once travelled. When a driver travels to a destination by a car, it is usual that the he does not completely remember the route to the destination even though he has previously travelled to the destination, and thus he has to travel to the destination for some times until he remembers the route and becomes able to travel to the destination without missing his way. Further, for a place to which he rarely travels, he forgets most of a route and is required to confirm the route to the destination by checking a map before or during his driving.

In view of the above problem, the inventors previously proposed an improved navigation device which is described in a Japanese Patent Application No. 3-218934. This navigation device stores the route through which a driver travels to a destination, and displays the stored route to the destination for driver's reference when he travels to the destination again.

FIG. 1 is a block diagram showing functions of the navigation device as described above. According to the navigation device, a current position measurement unit 102 measures the current position of a vehicle. Then, map information corresponding to the measured current position is outputted from a map data base 101 and the map information is displayed on a display unit 103 with the current position of the vehicle represented thereon. Simultaneously, a route management unit 104 stores the current position as a route data in a ring buffer, and displays a route to the current position as a normal route display (see arrow in display 3 of FIG. 1). In addition, the device stores route data between a collection start point and a collection termination point, each points is designated by an external command, in a reference route buffer together with information relating to the collection area. The route data stored in the reference route buffer is represented on the display 103 as a reference route data together with the map information when a driver instructs the display of the stored route data.

However, when a driver travels to a desired place along a way which he is not familiar to or he travels for the first time, he sometimes lose his way and takes the wrong way. In such a case, the above described navigation device stores and displays the route to the destination including the wrong way. This will be described with reference to FIG. 8A. In FIG. 8A, the point A represents a collection start point of route data and the point C represents a collection termination point of the route data. Now, it is assumed that a car runs from the point A to the point B, then returns to the point K, and then runs to the point B as indicated by arrows in FIG. 8A. In this case, even if the driver erroneously goes to the point B and returns to the point K, and then runs to the target point C, The above described navigation device stores the route data including the erroneous and unnecessary route data of going to the point B and returning back to the point K. If unnecessary route data such as the wrong way from the point K to the point B which is obtained by the erroneous running is directly displayed for driver's reference, he may drive the car along the erroneous way once again or be confused when he refers to the display. Therefore, such a route display has not been effectively used as a reference route display. Alternately, even if the running to the point B is not mistake, the route data of a half way from the point K to the point B is unnecessary.

SUMMARY OF THE INVENTION

It is an object of the present invention to provide a navigation device in which stored route data can be afterwards edited to erase unnecessary route so that routes along which a driver previously travelled can be effectively stored and represented.

According to one aspect of the present invention, there is provided a navigation device including measurement unit for measuring a current position of a vehicle and generating a current position data, route collection unit for generating route data on the basis of the current position data, place name extraction unit for extracting place name information with a predetermined interval from a map information in accordance with the current position data, storage unit for storing the route data and the place name information, the stored route data comprising a plurality of block route data each sectioned by the place name information, edit unit for editing the block route data stored in the storage unit, and display unit for extracting the route data from the storage unit and displaying the extracted route data together with the map information.

According to the navigation device of the present invention, the route collecting unit generates the route data on the basis of the current position data in correspondence to the running of the vehicle. The route data thus stored is used to display the route to the current position together with the current position. Upon receiving instruction of the route collecting start from external, the storage unit receives the route data generated by the route collecting unit and successively stores them in a predetermined area of the storage unit. At the same time, the map information extraction unit monitors a time or a travel distance to obtain a map information of a passed point every predetermined time or predetermined travel distance, and successively stores the map information in the storage unit together with the route data. The route data is stored in the storage unit being sectioned by the map information of the passed points. The route data stored in the storage unit is treated as a block basis. On the basis of the stored route data, the display unit displays a list of the map information and the edit unit moves (shift) the block route data between the map information or erases a part of the route data in response to the instruction from external.

Therefore, the route data of plural sections which are partially overlapped can be moved on a block basis to be collected into one section, and an undesired route data can be erased on a block basis to store and display a more effective route data.

BRIEF DESCRIPTION OF THE DRAWINGS

FIG. 7 is a flowchart for a route storage processing in the embodiment;

DESCRIPTION OF THE PREFERRED EMBODIMENT

A preferred embodiment according to the present invention will be described hereunder with reference to the accompanying drawings.

Figure 1:
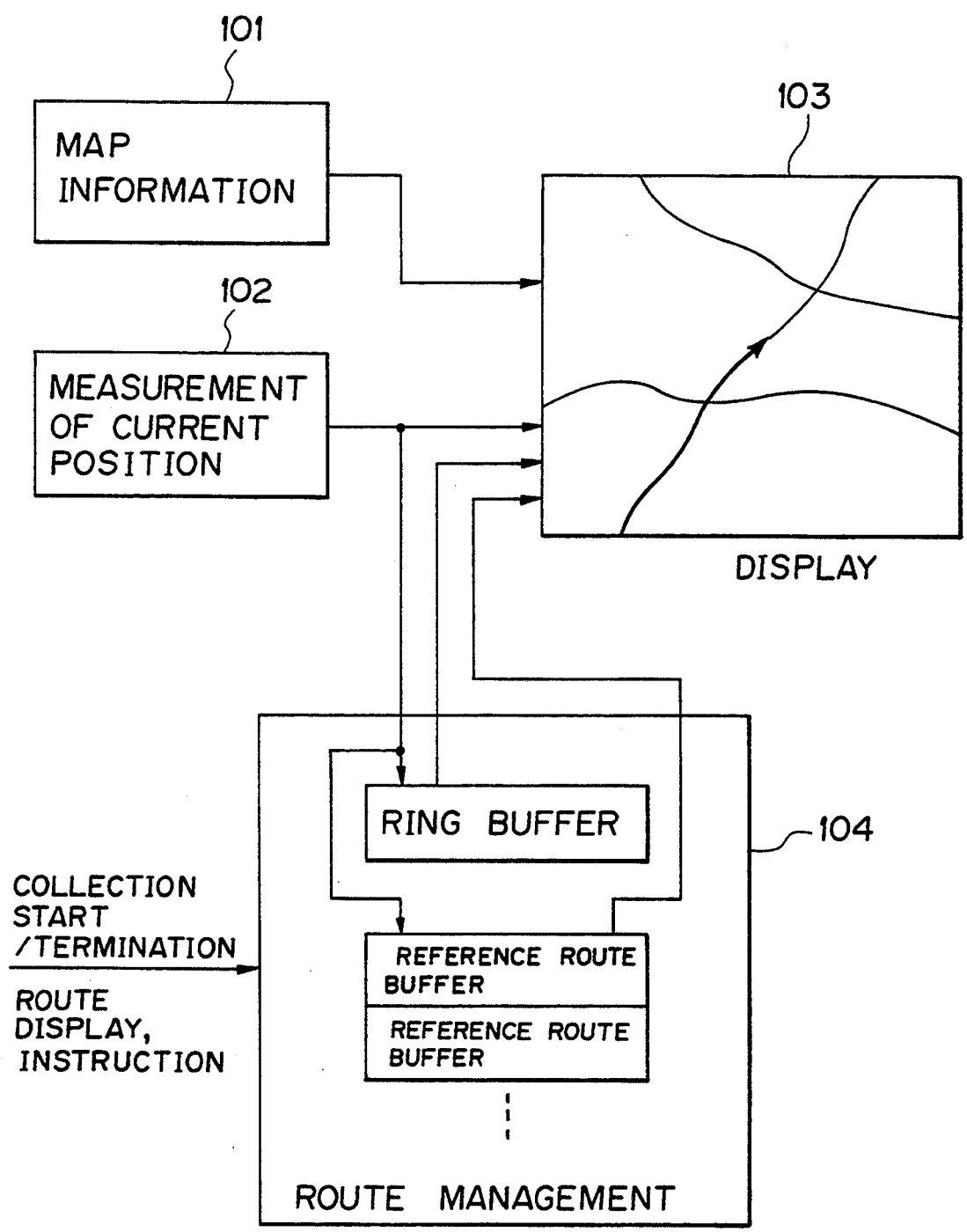
FIG. 1 is a block diagram showing functions of a navigation device.
Figure 2:
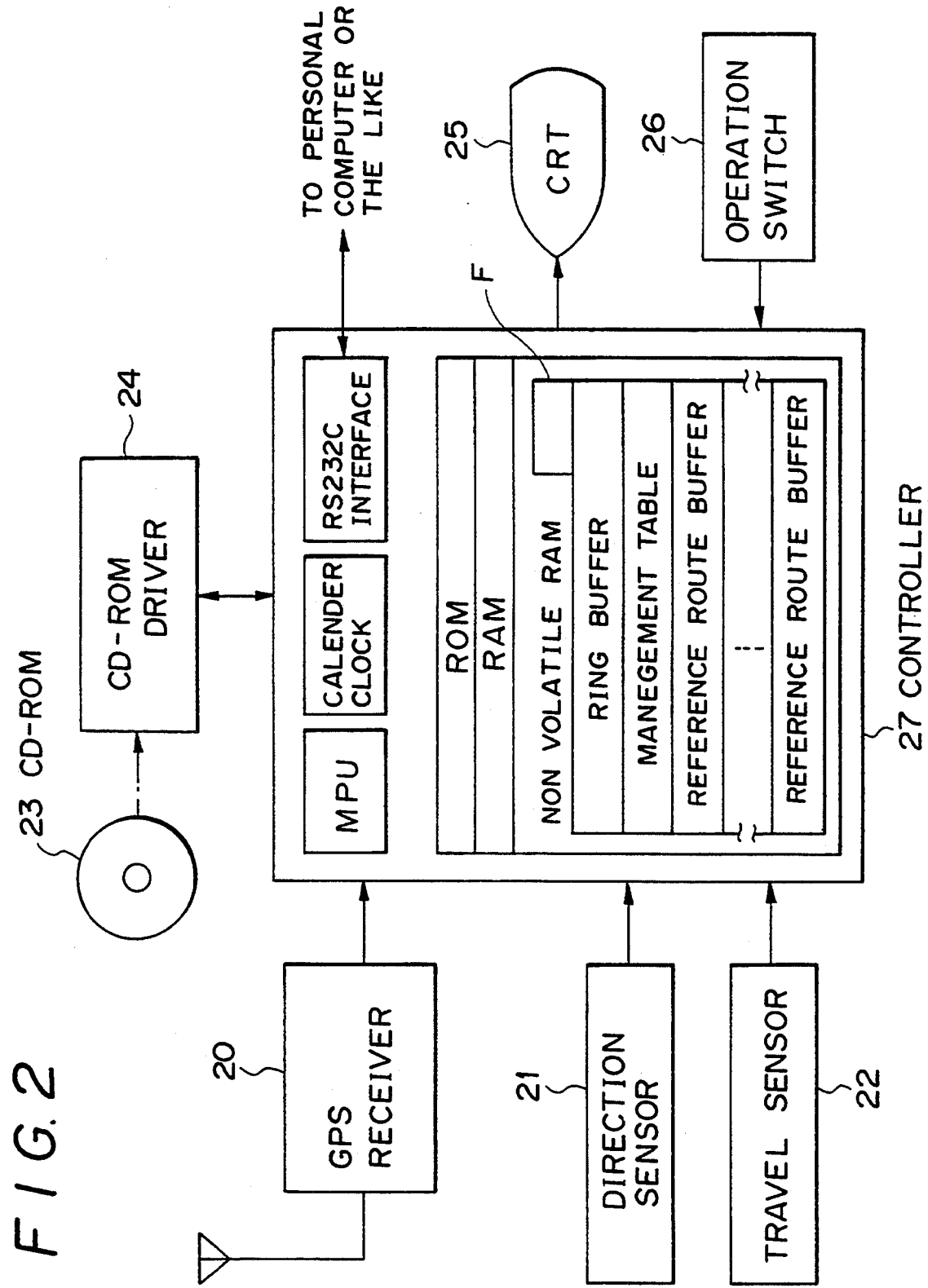
FIG. 2 is a block diagram showing an embodiment of a navigation device according to the present invention.

FIG. 2 is a block diagram showing the construction of a navigation device mounted on a vehicle. As shown in FIG. 2, the navigation device includes a GPS (Global Positioning System) receiver 20 for receiving an electric wave for measuring a current position of the vehicle, a direction sensor 21 such as a geomagnetic sensor or a gyroscope for detecting a travel direction of the vehicle, a travel sensor 22 for detecting a travel status such as a vehicle speed, a travel distance, etc., a CD-ROM 23 serving as data base of map information, a CD-ROM driver 24 for reading out information from the CD-ROM 23, a CRT (Cathode Ray Tube) 25 for displaying map information and other information, an operation switch 26 for inputting user's operational instructions, and a controller 27 for controlling the whole system of the device.

The GPS receiver 20, serving as position-measuring device, generates a current position data including latitude and longitude data on the basis of electric waves from a satellite. The direction sensor 21 and the travel sensor 22 constitutes in combination a stand-alone type position-measuring device. The current position data indicating the latitude and longitude of the vehicle is calculated on the basis of detection signals of the direction sensor 21 and the travel sensor 22 by calculation device built in the controller 7. The GPS position-measuring device and the stand-alone type position-measuring device are used selectively or in combination according to the navigation status so as to improve detection accuracy of the current position to be measured.

The controller 27 includes a MPU (Microprocessor Unit) for data processing and various controls, a ROM (Read Only Memory) and a RAM (Random Access Memory) for storing a program for the MPU and other data, a battery-backup nonvolatile RAM, a calendar clock for generating data of year, month, date and hour, an RS-232C interface for communicating with external, and various interfaces (not shown). The nonvolatile RAM includes a ring buffer for temporally storing the collected route data, a reference route buffer for storing the route data of every designated areas, and a management table area with which the stored route data is managed as files.

Figure 3:
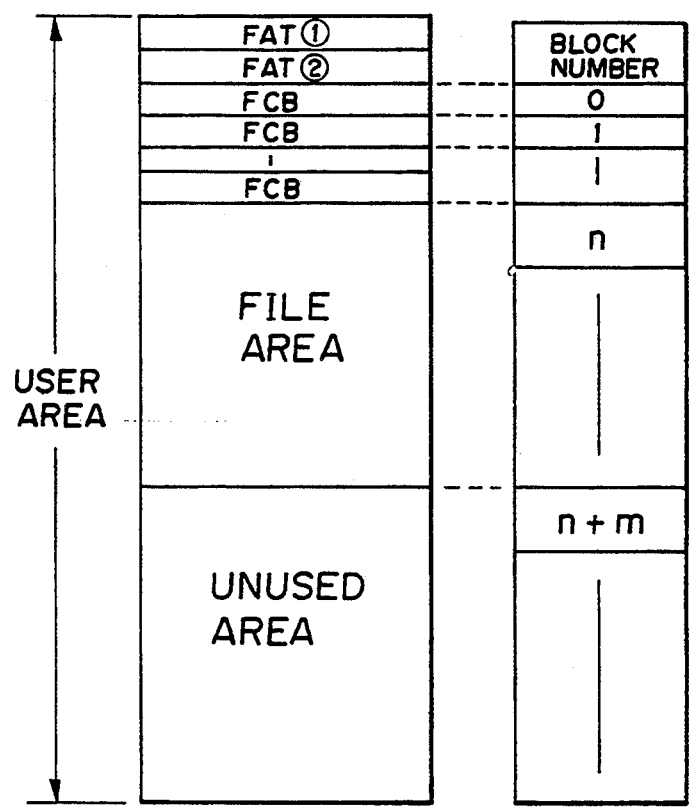
FIG. 3 shows a memory map for a memory file used as a reference route buffer in the embodiment.
Figure 4:
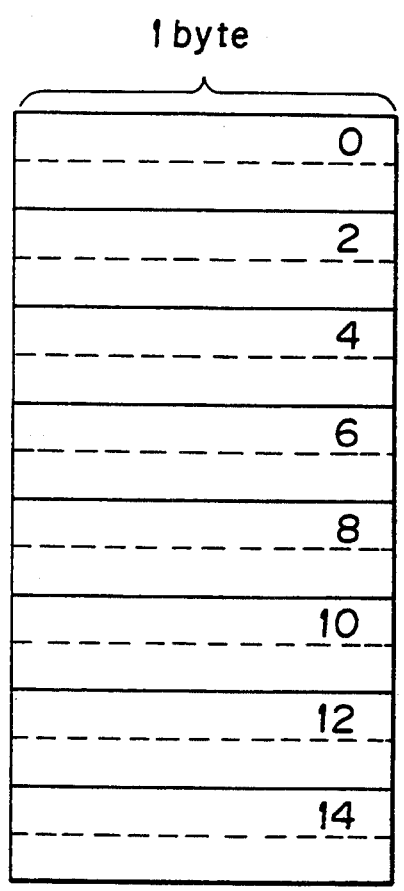
FIG. 4 shows a memory map of FAT in the embodiment.
Figure 5:
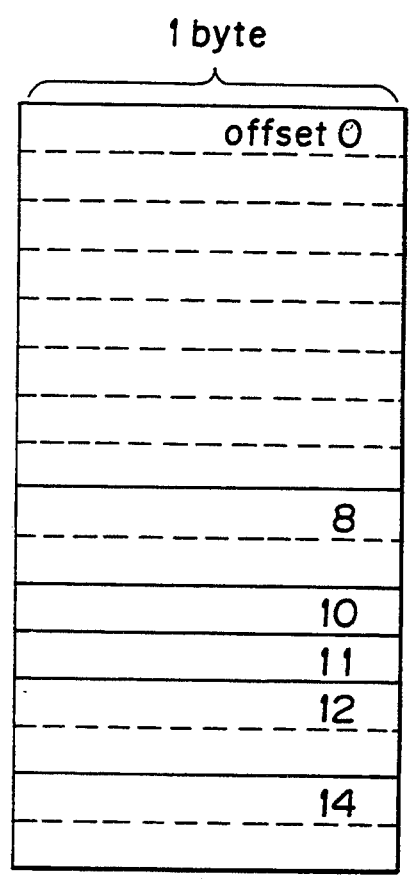
FIG. 5 shows a memory map of FCB in the embodiment.
Figure 6:
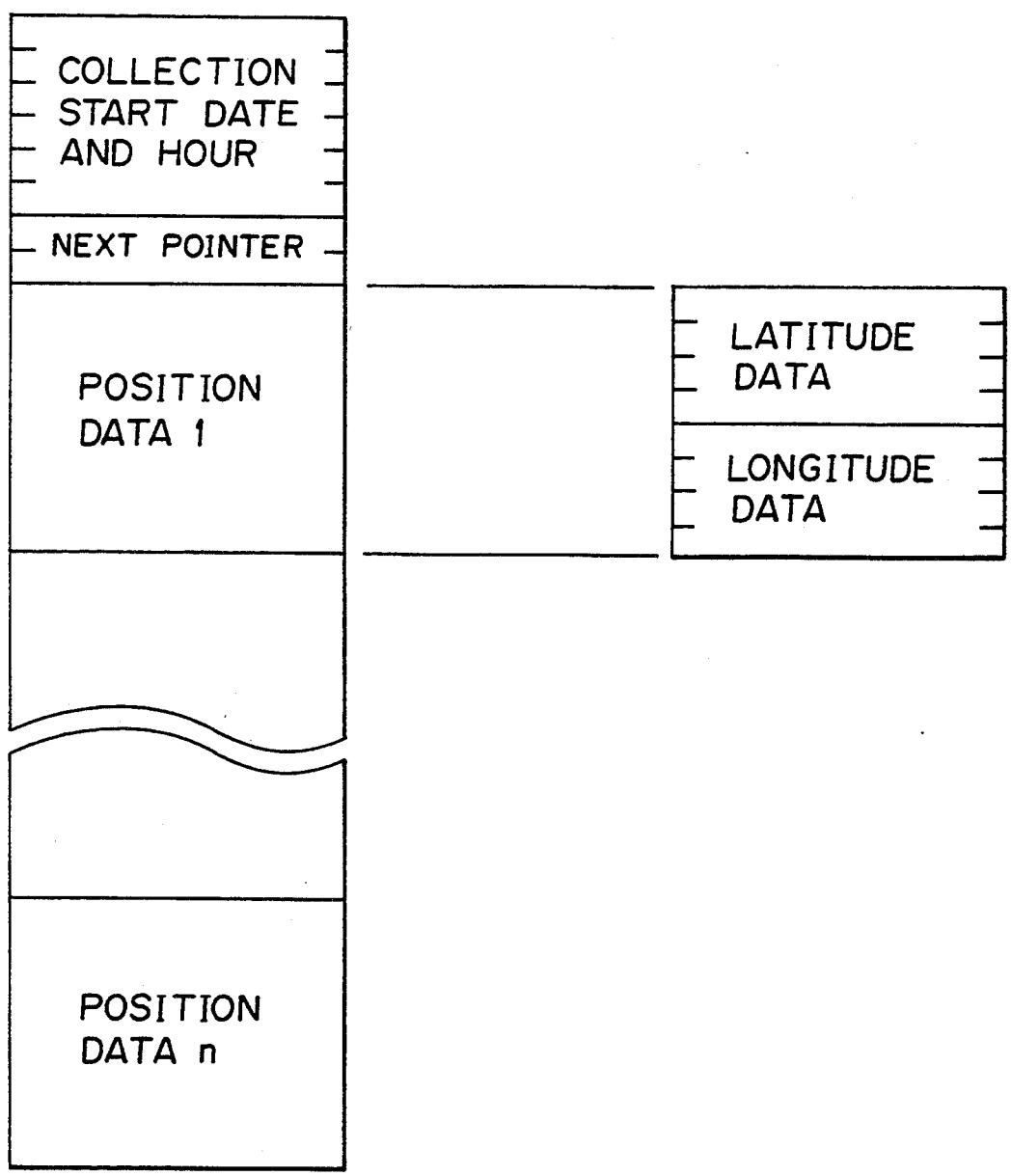
FIG. 6 is a format diagram of an example of a route file data in the embodiment.

FIG. 3 shows a memory map of the nonvolatile RAM. As shown in FIG. 3, in the nonvolatile RAM, FAT (File Allocation Table) and FCB (File Control Block) are designed as the management table, and a file area is designed as the reference route buffer. FIGS. 4 and 5 show the map of the FAT and the map of the FCB, respectively, and FIG. 6 shows an example of the data construction of the route file data. In the route file data shown in FIG. 6, a collection start date and hour and a NEXT pointer indicating the storage position of the route data are formed, and the route data is successively stored subsequent to the NEXT pointer. In the example shown in FIG. 5, the route file data is so designed that the current position data (latitude and longitude) is directly stored, however, it may be so designed that the route data which is subjected to data compression is stored. Further, a flag area F is also provided in the nonvolatile RAM as shown in FIG. 2 to store a route collection flag which will be used at the time of route collection.

When the navigation device is switched ON, the controller 27 first receives a current position data from the GPS receiver 20 or from both of the direction sensor 21 and the travel sensor 22. Then, the controller 27 reads out a map information corresponding to the current position data from the CD-ROM 23 via the CD-ROM driver 24 so as to display the read-out map information on a CRT 25 with a current-position mark superimposed thereon. The current position data is periodically obtained to renew the display of the current position mark and the current map in accordance with the movement (travel) of the vehicle. In response to an instruction inputted via the operation switch 26, various kinds of information other than the map information are read out from the CD-ROM 23 or ROM and displayed on the CRT 25. Further, the controller 27 carries out various processing for route collection, route display, route storage and route edit. These processing will be described below.

In the route collection processing, the controller 27 periodically receives the current position data from the position-measuring device at every predetermined time or predetermined travel distance to store the data into the ring buffer as the route data. The current position data is compressed by extracting feature points such as a bent intersection, etc. and the compressed data is stored in the ring buffer as the route data. By this data compression a route data for a long-distance travel can be stored. The route data stored in the ring buffer is used for the route display processing. That is, in the route display processing, in addition to the display of the current position, the traveled route of the vehicle to the current position is displayed on a screen on the basis of the route data stored in the ring buffer. In this embodiment, the route display of the current position is referred to as "normal display" and the route display which is not related to the current position is referred to as "reference display", respectively. When the "reference display" is instructed, the controller 27 displays a list of the route data files stored in the nonvolatile RAM to promote selection of one of the files and reads out the route data of the selected file to display it with the map information.

Next, the route storage processing will be described.

FIG. 7 is a flowchart of route storage processing. The operation of route storage is carried out by monitoring a route storage start instruction and a route storage termination instruction inputted via the operation switch 26. That is, as shown in FIG. 7, through the monitoring operation of the route storage start instruction or the route storage termination instruction in steps S1 and S2, if the route storage start instruction is detected, the controller 27 executes initialize processing for the route storing, such as setting a route collecting flag, constructing files of the nonvolatile RAM, recording start date and hour at the head of the constructed file and initializing the NEXT pointer in steps S3 to S6. Subsequently, the constructed file area is expanded in step S11, and a place name of a current position, i.e., a place name information of the collection start point, is extracted from the map information in step S11. The place name information can be obtained from names of city, ward, town and village or map leaf names in the map information which are stored in the CD-ROM 23. Subsequently, the obtained place-name information is stored in a memory area designated by the NEXT pointer in step S12, and the NEXT pointer is incremented by one to temporally store the data of that time in a predetermined area of the RAM region in step S13. Then, the controller 27 turns the route collection flag ON, records the route data generated in the route collection processing into a memory area designated by the NEXT pointer, and successively carries outs a processing of incrementing the NEXT pointer by one to store the route data.

In the route storing, if there are no route storage start and termination instructions and the route collection flag is in ON state, the controller 27 compares the stored time with a current time to judge whether a predetermined time has elapsed or not in steps S7 to S9. If it is judged that the predetermined time has elapsed, no processing other than repeating this routine is carried out until the predetermined time elapses. If it is judged that the predetermined time has elapsed, the controller 27 carries out the processing from the step S10 to S13 to obtain and store place name information of the place (point) through which the vehicle has passed at this time. This processing are repeated at every constant time until the route collection termination instruction is received. If the route collection termination instruction is received, the route collection flag is reset and the storage of the route data for one area is terminated.

In the processing as described above, the place name information of the passed points may be obtained and recorded not at every constant time but at every constant travel distance. Specifically, travel distance data at the time when the place name information is obtained and stored may be stored on the basis of the output of the travel sensor 22, and the above processing may be carried out every time when the vehicle runs the predetermined distance.

Next, the route data and the place name information stored in the route storage processing will be described in more detail with reference to FIGS. 8A and 8B.

Figure 8A:
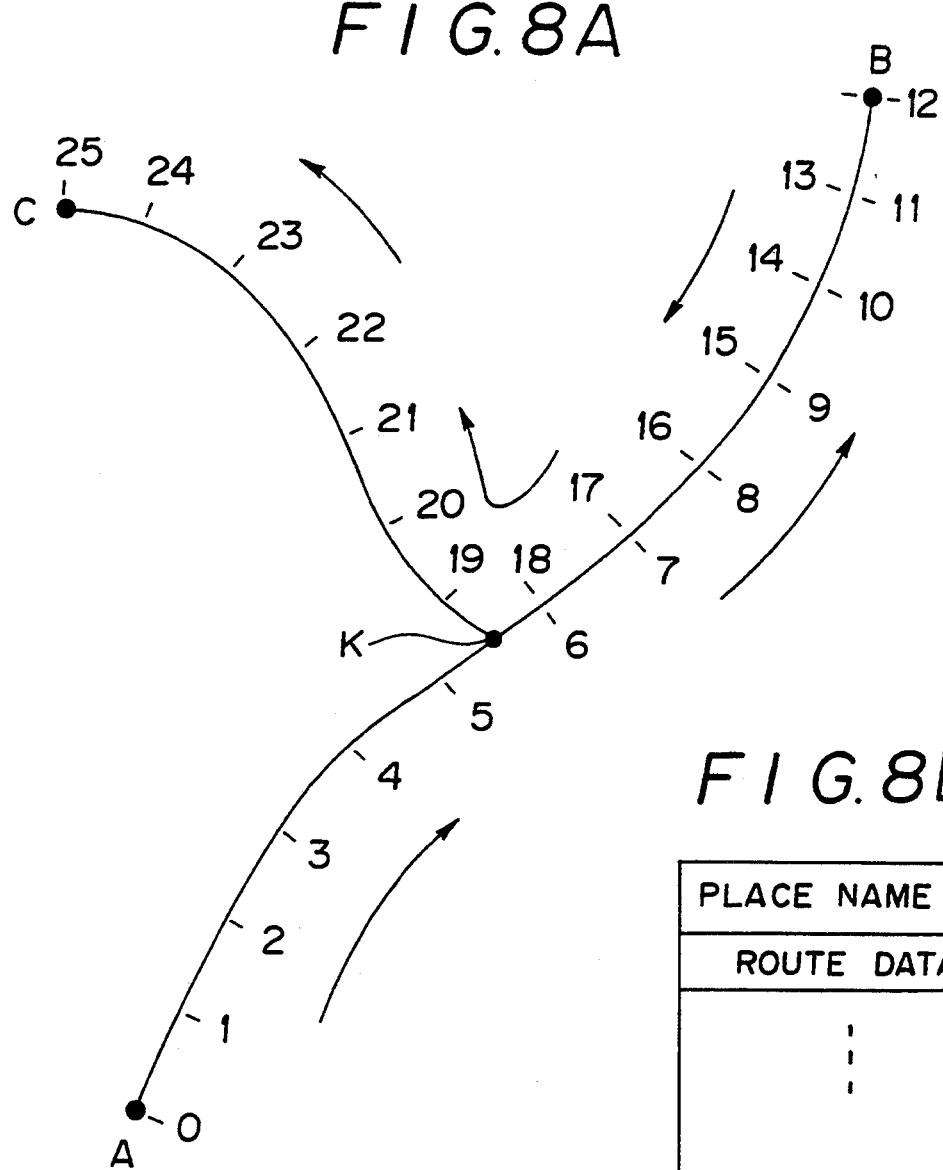
FIG. 8A and 8B are the explanatory diagrams for the route storage processing in the embodiment.
Figure 8B:
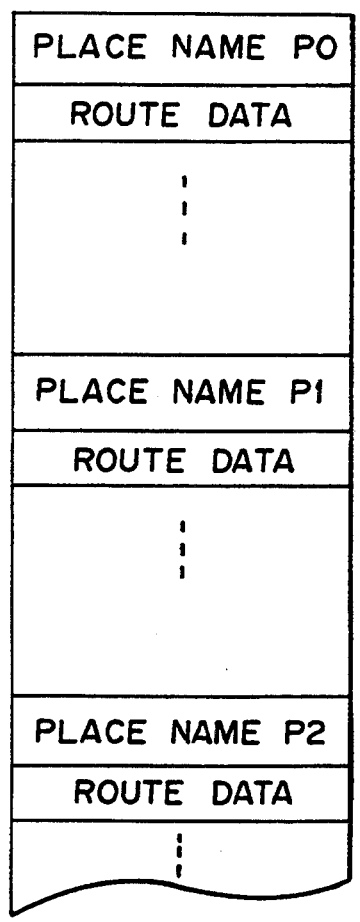

FIG. 8A shows a traveled route from a storage start point A to a storage termination point C, and FIG. 8B shows a storage image of the route data and the place name information. The traveled route shown in FIG. 8A represents such a case that the vehicle runs from the point A to the point B once, returns from the B point to the K point and then runs to the point C, as indicated by the arrows. Numerals "0" to "25" represent points through which the vehicle passed at every predetermined time or at predetermined travel distance. As shown in FIG. 8B, in the recording of the place name information and the route data, a place name information "P0" is first obtained at the point A and recorded, and then route data from the point A to the passed point 1 are recorded. Subsequently, a place name information "P1" is obtained at the passed point 1, and then a route data from the passed point 1 to the passed point 2 are successively recorded. The whole route data are recorded in such a manner as to be sectioned by each of the successively recorded place name information "Pn", and finally the place name information "P25" at the point C which is corresponds to the storage termination point is obtained. Then, the route recording process is completed.

Figure 9:
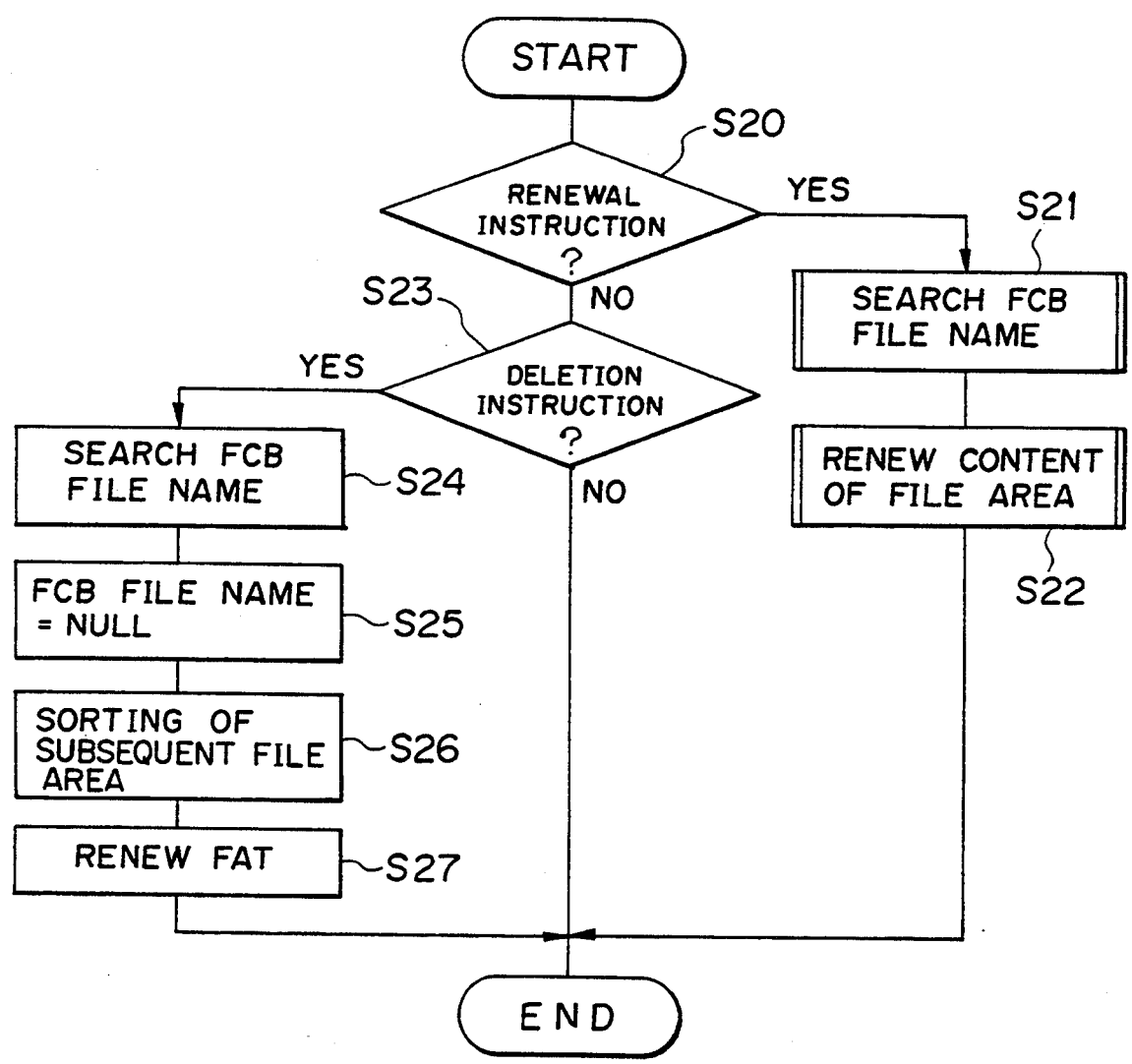
FIG. 9 is a flowchart of a route editing processing in the embodiment.

Next, the route edit processing will be described with reference to the flowchart of FIG. 9.

In the route edit processing, upon receiving a route edit instruction from the operation switch 26, the controller 27 displays a list of file names of the stored route data to promote selection of one of the files to be edited. When the file is selected, the controller 27 subsequently displays a menu of processing items. In the route edit processing represented by the flowchart of FIG. 9, a file renewal processing and a file deletion processing are shown. That is, upon receiving the renewal instruction of the file contents, the selected file name is retrieved from the FCB to renew of the file area in steps S20 to S22. On the other hand, upon receiving the file deletion instruction, the selected file name is retrieved from the FCB and deleted by replacing the file name of the FCB with a blank (NULL) in steps S24 and S25. Thereafter, the file area subsequent to the blanked area is sorted to renew the FAT in steps S26 and S27, and then the process is completed.

In the renewal processing of the file area in step S22, the route data sectioned by the place name information is further deleted block by block in accordance with a menu selection. In the delete processing of each blocks, the controller 27 first searches the route data of the selected file to successively obtain the place name information thereof and displays the list of them. Thereafter, the controller 27 deletes the route data of the blocks which are stored subsequent to the specified place name information.

This process will be described in more detail with reference to FIG. 8A. If the vehicle erroneously runs from the point K to the point B, the route data from the point K to the point B are unnecessary, and accordingly the data between place names "P6" and "P17" out of the place names "P0" to "P25" are successively specified and deleted. The area whose data are deleted as described above is filled with data subsequent to the deleted data. By this operation, the route data after the place name "P18" is located subsequently to the route data of the place name "P5", and thus the route data between the point K and the point B which are unnecessary for the display are deleted.

As described above, in the navigation device of the present embodiment, when a storage instruction is inputted, the route data generated during the travelling of the vehicle are stored as reference route data in a memory, and when the reference display is instructed, the user-specified reference route data is displayed. Further, since the stored route data are sectioned by the place name information of the points passed every constant time or every constant travel distance, the route data thus stored can be edited as block data and the route data of an undesired route can be deleted. Therefore, even when the driver misses his way in his travel along an unfamiliar way such as a way which has not yet been travelled by the driver, the route data stored in this travelling can be edited to be effective reference route data. Therefore, the route data obtained in only one travel can be prevented from being nullified by the missing of the way or the like. Accordingly, the driver can refer to an effective route when he travels again along the way which has been once travelled, and thus an assist effect for the driving can be improved.

In this embodiment, the reference route buffer is provided in the nonvolatile RAM inside of the device. Alternately, the route data may be output directly from the ring buffer through the RS-232C interface to a personal computer or from the nonvolatile RAM and stored. Further, the route data may be inputted from the external and displayed. An external storage device such as a rewritable magneto-optical disk device or an IC card device may be provided as device for storing the route data.

As described above, according to the navigation device of the present invention, the route data of the way along which the vehicle runs is stored, so that the driver can easily refer to the route data when he travels to the same destination again. In addition, the stored route data are sectioned by the place name information so that the driver can edit the route data as block data, and an undesired route data can be deleted and more effective route data may be stored and displayed. Therefore, the assist for the driving can be more effectively performed.

What is claimed is:

1. A navigation device comprising:

measurement means for measuring a current position of a vehicle and generating current position data based on said measuring;
   route data generation means for generating route data indicating a route travelled by the vehicle on the basis of said current position data;
   place name extraction means for extracting place name information indicating a name of a place travelled by the vehicle from stored map information in accordance with said current position data with a predetermined interval;
   storage means for storing the route data and the place name information in such a manner that said route data is sectioned into a plurality of block route data at positions corresponding to the places indicated by said place name information;
   edit means for designating the block route data by the name of the place and editing the designated block route data stored in said storage means; and
   display means for extracting the route data from said storage means and displaying the extracted route data together with the map information.

2. A navigation device according to claim 1, wherein said route data indicates a route specified by a start point and a destination point.

3. A navigation device according to claim 2, further comprising input means for designating the start point and the destination point.

4. A navigation device according to claim 1, wherein said predetermined interval comprises a predetermined time-interval.

5. A navigation device according to claim 1, wherein said predetermined interval comprises an interval corresponds to a predetermined travel distance of said vehicle.

6. A navigation device according to claim 1, further comprising means for storing the map information.

7. A navigation device according to claim 1, wherein said route data generation means generates the route data by compressing the current position data.

8. A navigation device according to claim 1, wherein said edit means comprises means for displaying on said display means a plurality of route data stored in said storage means.

9. A navigation device according to claim 1, wherein said edit means deletes the block route data designated.

10. A navigation device according to claim 1, wherein said storage means stores the route data and the place name information in a manner that the block route data is partitioned by the place name information.

* * * * *